UNITED STATES PATENT OFFICE.

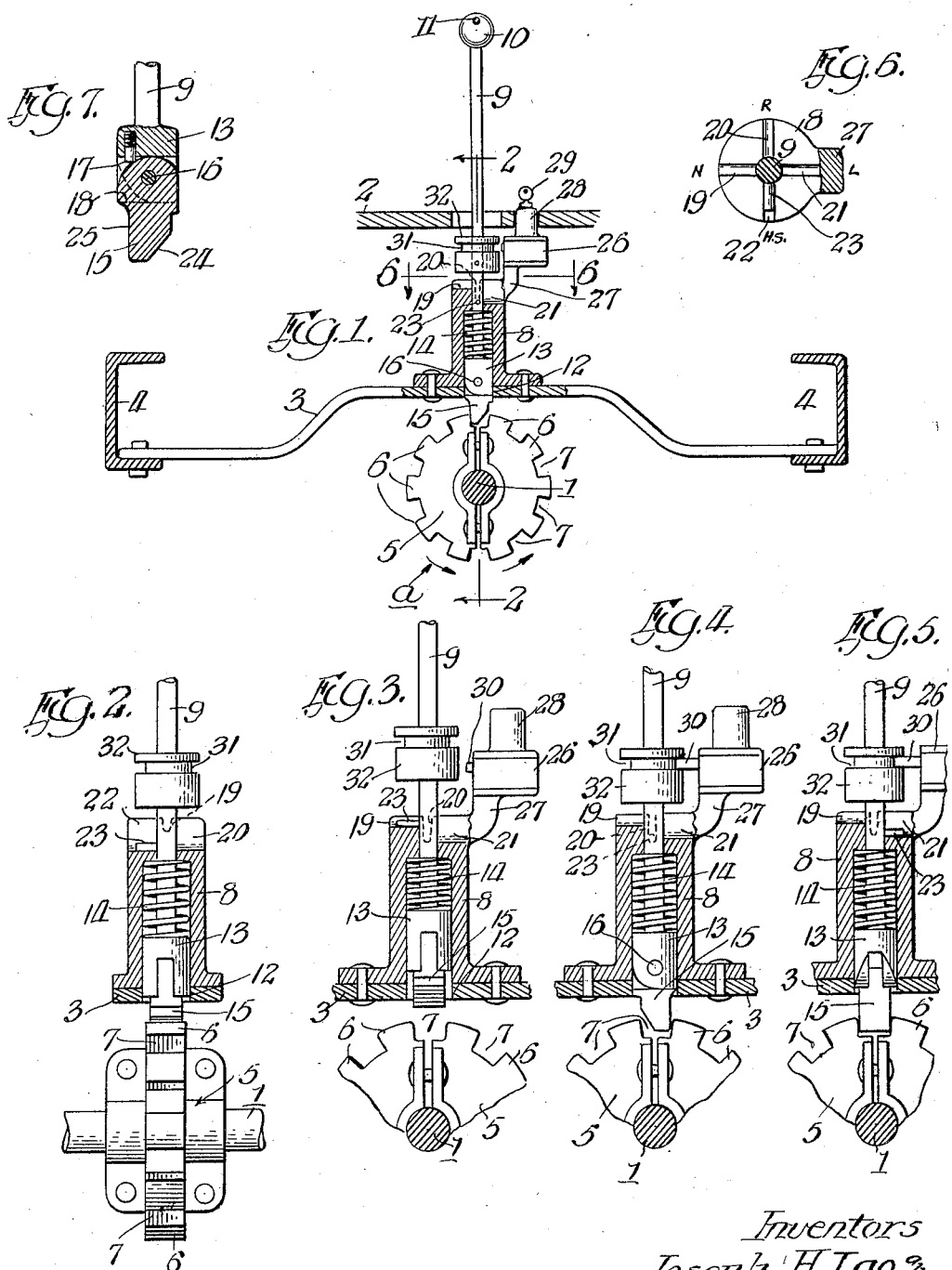

JOSEPH H. IGO AND WILLIAM T. McKAY, OF CHICAGO HEIGHTS, ILLINOIS.

LOCK FOR MOTOR-VEHICLES.

1,387,156.  Specification of Letters Patent.  Patented Aug. 9, 1921.

Application filed September 24, 1920. Serial No. 412,519.

*To all whom it may concern:*

Be it known that we, JOSEPH H. IGO, a citizen of the United States, and WILLIAM T. McKAY, a subject of the King of Great Britain, residing at Chicago Heights, in the county of Cook and State of Illinois, have invented new and useful Improvements in Locks for Motor-Vehicles, of which the following is a specification.

This invention relates to locks for motor vehicles, such as automobiles, motor trucks and the like.

The lock of our invention is used with the propeller or main driven shaft of a motor vehicle and may be readily and easily operated from the driver's seat and be set in any one of the following four positions: First, the lock will be set and retained in neutral position when not in use, so that the car may be freely moved or run forward or backward. Second, when the car is standing still or parked in a garage or along a public street or highway, the lock may be set to lock the car from being moved, towed, pushed, or driven either forward or backward, and thus prevent the car from being stolen by being pushed or towed away. Third, should the laws of the place where the car is used or should the insurance underwriters require that while the car, when parked, may be locked against forward movement it must not be locked against being pushed rearward so that the car may be moved in case of fire or public necessity, the lock may set in that position. Fourth, when the car is traveling up a hill or grade, the lock may be set to hold the car from moving backward and thus avoid accident should the engine die or be stopped for any reason while the brakes are off or should the brake when applied fail to work. The lock may be thrown into this position while the car is traveling, as the lock when in such position does not interfere with the free forward movement of the car. This is the "hill lock" position of the parts and allows the car to be immediately started after the engine is revived as none of the brakes are on and the clutch is in.

The invention also consists in the features of construction hereinafter described and claimed and illustrated in the accompanying drawings, in which—

Figure 1 is a vertical sectional view of a lock constructed and applied to a car in accordance with our invention;

Fig. 2 is an enlarged vertical sectional view taken on line 2—2 of Fig. 1;

Figs. 3, 4, and 5 are vertical sectional views, similar to that shown in Fig. 1, and illustrating the two locking members of the lock in three of the different positions heretofore mentioned;

Fig. 6 is a horizontal sectional view taken on line 6—6 of Fig. 2; and

Fig. 7 is a vertical sectional view of a detail of construction to be hereinafter described.

In the drawings, 1 indicates the propeller or main driven shaft of a motor vehicle, such as an automobile. This shaft extends from the transmission mechanism to the differential between the rear wheels of the car, as customary in automobile construction.

The automobile floor is indicated by 2, in Fig. 1, and beneath it is a bracket 3 extending between the side members 4, 4 of the frame or chassis and riveted thereto. The bracket 3 is arched up and over the shaft 1, and on the shaft is rigidly secured a split gear 5 having teeth 6, between which are straight sided notches or slots 7. The straight sides of the slots 7 are not radial but are substantially parallel to a radial line extending through the center of the slot.

Mounted on the bracket 3 above the shaft 1 is a tubular post 8 riveted to the bracket and extending toward the floor 2, as shown in Fig. 1. Rotatably and slidably mounted in the post 8 is a rod 9 extending upward above the floor 2 through a hole therein. The rod extends upward a sufficient distance to have its upper end grasped by the hand of the driver of the car from his seat. The upper end of the rod 9 is provided with a ball or knob 10 to facilitate grasping the rod, and said ball has a side projection 11 to indicate, by its position, the position of the rest of the locking parts to be presently described. This projection 11 not only gives visible indication, but allows the operator upon grasping the ball and feeling the position of the projection to know instantly the position of the parts.

The rod 9 extends downward below the post 8, toward the shaft 1, through a hole 12 provided in the bracket 3. A portion 13 of the rod in the post is enlarged to provide a seat for a coiled spring 14 about the rod and bearing upward against the top wall of the chamber in which the spring is located. The extreme lower end of the rod is bifurcated to receive a trip-dog or pawl 15, made square in cross-section and adapted to be moved by the rod into and out of any one of the slots 7 between the teeth of the gear 5. The gear constitutes one of the locking members of the mechanism, while the rod and its pawl 15 constitute the other locking member. The pawl is pivoted between the forked portions of the rod on a horizontal pin 16. A spring pressed plunger 17 carried by the rod constantly bears against the rounded upper edge of the pawl to hold it normally in the position shown in the drawings and with the straight upper edges 18 of the pawl against the straight portion of the lower end of the rod. This prevents the pawl from being moved about the pivot pin in one direction. The rod end is rounded on the opposite side to allow the pawl to be moved on said pin in the opposite direction when the occasion demands.

The upper portion of the post 8 is provided with four radially arranged slots 19, 20, 21, and 22, all opening upwardly through the top of the post. These slots are spaced apart substantially 90° from each other, as shown in Fig. 6, and extend down into the post. All of the slots, except the one 19, extend down into the post the same distance for the purposes presently to be mentioned. The rod 9 has a pin 23 rigidly secured thereto and projecting outward from one side thereof and is receivable in any one of said slots.

The mechanism shown and described operates as follows. When the parts occupy the positions shown in Figs. 1, 2, and 6, the pin 23 is in the slot 22 and rests against the bottom thereof and allows the pawl 15 to project into one of the spaces 7 between two of the teeth 6 on the gear 5. The shaft 1, when driven by the engine in the direction indicated by the arrow $a$ in Fig. 1, propels the car forward, and, as the pawl 15 has its beveled or cam face 24 facing toward the direction of rotation, and the pawl is in a position permitting it to be swung about its pivot pin 16, the pawl will be tripped by and ride over the teeth 6 as the gear 5 is rotated with the shaft. The spring 14 constantly urges the rod downward and this, together with the spring pressed plunger 17, returns and keeps the pawl in the spaces 7 as they are brought under the rod. As the opposite face 25 of the pawl is straight, and the pawl cannot be swung in the opposite direction, the shaft cannot be rotated in a rearward direction because the pawl engages with a tooth 6 and holds the shaft against turning in that direction. This position is termed the "hill lock" position of the parts, and prevents the car from moving backward down a hill or grade should the engine stop or be stopped for any purpose and the brakes be off or, if thrown in, fail to work while ascending a hill or grade. Driving of the car forward is not interfered with by the pawl 15, as the latter readily rides over the teeth 6, and the parts may be shifted or moved into this position before the occasion demands and be in position for immediate use, and thus guard against accidents.

To move the parts from the position just described to neutral position, that is, with the pawl 15 fully out of the path of movement of the gear teeth 6, and thus permit the car to be driven or moved either forward or backward, the rod 9 is grasped, raised upward against the spring 14 until the pin 23 is out of the slot 22, whereupon the rod is given a quarter of a turn toward the shallow slot 19 to bring the pin into said slot and allowed to drop into the same by the action of the spring 14. Fig. 3 shows the parts in this position.

When the rod 9 is raised and given a full half turn toward the slot 21, the spring 14 forces the pawl 15 down in one of the spaces 7 between the gear teeth 6 and locks the shaft 1 against turning in either direction, because at such time the cam face 24 of the pawl is turned away from the sides of the associated gear teeth, and the pawl occupies a position with its side faces between said gear teeth, as shown in Fig. 5. This locks the car from being moved forward or rearward under its own power or by pushing or towing, as the lock takes hold on the shaft 1 to the rear of the transmission, and, even with the transmission in neutral, the shaft 1 cannot be turned. The lock is set in this position when the car is parked in a garage or on a public street or highway, and thus theft of the car is absolutely prevented as the car cannot be stolen by towing it away. To lock the parts in this position, we provide a key operated lock 26, riveted or otherwise rigidly secured to the post 8 below the floor 2. The lock casing, as shown, is secured to the post by a bracket 27. The barrel 28 of the lock extends through a hole in the floor 2 and the cylinder therein is reached by the key 29, as shown in Fig. 2. This lock has a bolt 30 to be thrown by the key 29 into and out of the annular groove 31 in a block or collar 32 rigidly secured to the rod 9 above the post and below the floor 2. This position of the parts prevents the collar and bolt being easily reached and tampered with, and thus makes the car theft-proof and can only be unlocked by an authorized person having a key which will unlock the lock 26.

Should the law of the place where the car is used, or the insurance underwriters or company in which the car is insured require that the car when parked and locked be capable of being moved or pushed rearward in case of fire or other emergency, the pin 23 is seated in the slot 20. This allows the pawl 15 to be in one of the spaces between the gear teeth, like in the "hill lock" position, but the pawl is reversed so that its cam face 24 faces the direction of rearward rotation of the shaft, as shown in Fig. 4. The car is locked against forward movement, but may be moved rearwardly, as the pawl will be swung about its pivot pin by the teeth and ride over them as the gear is turned rearward. To lock the rod from being raised out of this position by any one except the person who has a key to the lock 26, the bolt 30 is thrown to engage the groove 31 of the collar 32.

The slots 20, 21, and 22 all extending downward into the post 8 the same distance, brings the collar 32 into the same position when the pin 23 is seated in any of said slots. This enables the bolt 30 to be thrown into the groove 31 when the parts are in any of such positions.

While we have shown and described in detail herein a form of locking mechanism embodying our invention, it is of course understood that the details of construction and arrangement of parts may be variously changed and modified without departing from the spirit and scope of our invention.

We claim as our invention:

1. The combination with a shaft of a motor vehicle, of a locking mechanism, comprising two locking members, one fixed on said shaft to rotate therewith, and the other locking member being movably mounted on a fixed part of the motor vehicle and adapted to be moved into and out of locking engagement with the locking member on said shaft, said locking members having interlocking parts adapted when engaged in one position to lock the shaft against rotation in either direction, and when engaged in either one of two other positions to lock the shaft against rotation in one direction only.

2. The combination with a shaft of a motor vehicle, of a locking mechanism, comprising two locking members, one fixed on said shaft to rotate therewith, and the other locking member being movably mounted on a fixed part of the motor vehicle and adapted to be moved into and out of locking engagement with the locking member on said shaft, said locking members having interlocking parts adapted when engaged in one position to lock the shaft against rotation in either direction, and when engaged in either one of two other positions to lock the shaft against rotation in one direction only, and means having a lock bolt adapted to be moved into engagement with said movable locking member when in any of said positions.

3. The combination with a shaft of a motor vehicle, of a locking mechanism, comprising two locking members, one fixed on said shaft to rotate therewith, and having a plurality of teeth, the other locking member being yieldably and movably mounted on a fixed part of the motor vehicle and adapted when engaged with said teeth in one position to lock the shaft against rotation in either direction, and said movable locking member adapted when engaged with said teeth in either of two other positions to lock the shaft against rotation in one direction only.

4. The combination with a shaft of a motor vehicle, of a locking mechanism, comprising two locking members, one fixed on said shaft to rotate therewith, and having a plurality of teeth, the other locking member being yieldably and movably mounted on a fixed part of the motor vehicle and adapted when engaged with said teeth in one position to lock the shaft against rotation in either direction, and said movable locking member having its end which engages said teeth provided with an inclined face on one side and a straight face on the opposite side to permit the teeth, when the movable locking member engages the same in either of two positions, to ride under said inclined face when the shaft is rotated in a direction toward said inclined face and to lock the shaft against rotation in the opposite direction.

5. The combination with a shaft of a motor vehicle, of a locking mechanism, comprising two locking members, one fixed on said shaft to rotate therewith, and the other locking member being yieldably and rotatably mounted on a fixed part of the motor vehicle, said locking members having interlocking parts adapted, when the movable locking member is turned to engage the locking member on said shaft into one position, to lock the shaft against rotation in either direction, and when turned to engage the locking member on said shaft into either of two other positions, to lock the shaft against rotation in one direction only.

6. The combination with the propeller shaft of a motor vehicle, of a locking mechanism, comprising two locking members, one fixed on said shaft to rotate therewith, and the other locking member being yieldably and movably mounted on a fixed part of the motor vehicle and adapted to be moved into and out of locking engagement with the locking member on said shaft, said locking members having interlocking parts adapted when engaged to permit the shaft to be rotated in a direction to propel the motor vehicle forward, but prevent the shaft from being rotated rearward.

7. The combination with the propeller shaft of a motor vehicle, of a locking mechanism, comprising two locking members, one fixed on said shaft to rotate therewith, and the other locking member being yieldably and movably mounted on a fixed part of the motor vehicle and adapted to be moved into and out of locking engagement with the locking member on said shaft, said locking members having interlocking parts, one having an inclined face on that side facing the direction of forward rotation of the shaft to permit the shaft to be rotated in that direction to propel the motor vehicle forward, and a straight face on the opposite side to lock the shaft against rotation rearward.

8. The combination with a shaft of a motor vehicle, of a locking mechanism, comprising a locking member fixed on said shaft to rotate therewith and having a plurality of teeth, a spring pressed rod slidably and rotatably mounted on a fixed part of the motor vehicle, a spring pressed pawl pivotally connected with said rod at its lower end and adapted to be moved by said rod into and out of locking engagement with said teeth, said pawl when turned by the rod to engage said teeth in one position locking the shaft against rotation in either direction, and when turned by the rod to engage the teeth in either of two other positions locking the shaft against rotation in one direction only.

9. The combination with a shaft of a motor vehicle, of a locking mechanism, comprising a locking member fixed on said shaft to rotate therewith and having a plurality of teeth, a post secured to a fixed part of the motor vehicle and having a plurality of slots therein, one of which is shallower than the rest, a spring pressed rod slidably and rotatably mounted in said post, a spring pressed pawl pivotally connected with the lower end of said rod and adapted to be moved by said rod into and out of locking engagement with said teeth, and a pin fixed to said rod and adapted when in one of the deep slots to allow the pawl to engage said teeth in a position locking said shaft against rotation in either direction, and when in either of two other deep slots to allow the pawl to engage said teeth in a position locking the shaft against rotation in one direction only, and when in the shallowest slot to hold the pawl out of engagement with said teeth.

10. The combination with a shaft of a motor vehicle, of a locking mechanism, comprising a locking member fixed on said shaft to rotate therewith and having a plurality of teeth, a post secured to a fixed part of the motor vehicle and having a plurality of slots therein, one of which is shallower than the rest, a spring pressed rod slidably and rotatably mounted in said post, a spring pressed pawl pivotally connected with the lower end of said rod and adapted to be moved by said rod into and out of locking engagement with said teeth, a pin fixed to said rod and adapted when in one of the deep slots to allow the pawl to engage said teeth in a position locking said shaft against rotation in either direction, and when in either of two other deep slots to allow the pawl to engage said teeth in a position locking the shaft against rotation in one direction only, and when in the shallowest slot to hold the pawl out of engagement with said teeth, and a lock bolt adapted to be moved into locking engagement with said rod when the pawl is in any of the first three positions mentioned.

11. The combination with a shaft of a motor vehicle, of a locking mechanism, comprising a locking member fixed on said shaft to rotate therewith and having a plurality of teeth, a post secured to a fixed part of the motor vehicle and having a plurality of slots therein, one of which is shallower than the rest, a spring pressed rod slidably and rotatably mounted in said post, a spring pressed pawl pivotally connected with the lower end of said rod and adapted to be moved by said rod into and out of locking engagement with said teeth, a pin fixed to said rod and adapted when in one of the deep slots to allow the pawl to engage said teeth in a position locking said shaft against rotation in either direction, and when in either of two other deep slots to allow the pawl to engage said teeth in a position locking the shaft against rotation in one direction only, and when in the shallowest slot to hold the pawl out of engagement with said teeth, a collar fixed to said rod and having an annular groove therein, and a lock bolt adapted to be moved into said groove when the pawl is in any of the first three positions mentioned.

12. The combination with the floor and a shaft of a motor vehicle, of a locking mechanism, comprising a locking member fixed to said shaft to rotate therewith and having a plurality of teeth, a bracket secured to a fixed part of the motor vehicle and extending across said shaft between the same and said floor, a tubular post secured to said bracket above said shaft and extending upward toward said floor, said post having a plurality of radially arranged slots in its upper portion and opening upward therethrough toward said floor, one of said slots being shallower than the rest, a spring pressed rod slidably and rotatably mounted in said post and extending upward therefrom through and above said floor, a spring pressed pawl pivotally connected with the lower end of said rod and adapted to be moved by the rod into and out of locking engagement with said teeth, a pin fixed to said rod and adapted when in one of the deepest slots to allow the pawl to engage said teeth in a position locking said shaft against rotation in either direction, and when engaged in either of two other deep slots to allow the pawl to engage said teeth in a position locking said shaft against rotation in one direction only, and when in the shallowest slot to hold the pawl out of engagement with said teeth, a collar fixed to said rod above said pin and having an annular groove therein, and a key operable lock secured to said post below the floor and accessible from above the floor, said key operable lock having a bolt adapted to be moved into and out of locking engagement with said groove when said pawl is in any of the first three positions mentioned.

In testimony that we claim the foregoing as our invention, we affix our signatures this 20th day of Sept., A. D. 1920.

JOSEPH H. IGO.
WILLIAM T. McKAY.